(12) United States Patent
Barua et al.

(10) Patent No.: US 10,940,535 B2
(45) Date of Patent: Mar. 9, 2021

(54) METHOD AND SYSTEM FOR ADDITIVE MANUFACTURING

(71) Applicant: General Electric Company, Schenectady, NY (US)

(72) Inventors: Ananda Barua, Glenville, NY (US); Sathyanarayanan Raghavan, Ballston Lake, NY (US); Ken Salas Nobrega, Schenectady, NY (US); Arunkumar Natarajan, Niskayuna, NY (US); Vadim Bromberg, Schenectady, NY (US); Raymond Floyd Martell, Cincinnati, OH (US); Meghan J. Borz, Buena, NJ (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 213 days.

(21) Appl. No.: 16/003,988

(22) Filed: Jun. 8, 2018

(65) Prior Publication Data
US 2019/0375008 A1 Dec. 12, 2019

(51) Int. Cl.
*B22F 3/00* (2006.01)
*B33Y 10/00* (2015.01)
(Continued)

(52) U.S. Cl.
CPC ............... *B22F 3/008* (2013.01); *B22F 3/24* (2013.01); *B28B 1/001* (2013.01); *B28B 11/243* (2013.01);
(Continued)

(58) Field of Classification Search
CPC ...... B22F 3/008; B22F 3/24; B22F 2003/247; B22F 1/0059; B22F 5/003; B22F 3/1017;
(Continued)

(56) References Cited

U.S. PATENT DOCUMENTS

| 6,352,669 B1 | 3/2002 | Cooper et al. |
| 2004/0159985 A1 | 8/2004 | Altoonian et al. |

(Continued)

FOREIGN PATENT DOCUMENTS

| EP | 0633440 A1 | 1/1995 |
| WO | 2018102021 A1 | 6/2018 |

OTHER PUBLICATIONS

Strano, C., et al.; "A new approach to the design and optimisation of support structures in additive manufacturing", The International Journal of Advanced Manufacturing Technology, vol. 66, Issue: 9-12, pp. 1247-1254, Jun. 2013.

(Continued)

*Primary Examiner* — Jessee R Roe
*Assistant Examiner* — Rebecca Janssen
(74) *Attorney, Agent, or Firm* — Fletcher Yoder, P.C.

(57) ABSTRACT

A binder jet printed article includes a part having a top portion, a bottom portion, and an overhang extending from the top portion and a support structure formed around the part that may block deformation of the part during post-printing thermal processing. The support structure includes a skid positioned adjacent to the bottom portion that may support the part, a first plurality of support features disposed along an outer perimeter of the skid, and a second plurality of support features disposed on the top portion of the printed part. The first and second plurality of support features form a lattice around the printed part such that the printed part is nested within the support structure.

10 Claims, 8 Drawing Sheets

(51) Int. Cl.
   *B33Y 40/00*   (2020.01)
   *B22F 3/24*    (2006.01)
   *B33Y 80/00*   (2015.01)
   *B28B 1/00*    (2006.01)
   *B28B 11/24*   (2006.01)

(52) U.S. Cl.
   CPC ............... *B33Y 10/00* (2014.12); *B33Y 40/00* (2014.12); *B33Y 80/00* (2014.12); *B22F 2003/247* (2013.01)

(58) Field of Classification Search
   CPC ............ B22F 3/1021; B22F 2003/1058; B22F 3/1055; B33Y 10/00; B33Y 40/00; B33Y 80/00; B33Y 30/00; B28B 1/001; B28B 11/243; C04B 2235/6026
   See application file for complete search history.

(56) References Cited

U.S. PATENT DOCUMENTS

| | | | |
|---|---|---|---|
| 2007/0003426 | A1 | 1/2007 | Lu et al. |
| 2016/0303654 | A1 | 10/2016 | Derguti et al. |
| 2017/0297100 | A1 | 10/2017 | Gibson et al. |
| 2017/0297106 | A1* | 10/2017 | Myerberg ................. B22F 7/02 |
| 2018/0001381 | A1 | 1/2018 | Kimblad et al. |
| 2018/0162060 | A1* | 6/2018 | Mark .................... B29C 64/165 |
| 2018/0371920 | A1* | 12/2018 | Packer .................... F01D 9/065 |

OTHER PUBLICATIONS

Satyanarayana, A., et al.; "Applications of Laser Inspection for Precision Components", Materialstoday : proceedings, vol. 4, Issue: 2, pp. 1230-1235, 2017.

PCT/US2019/035889; International Search Report and Written Opinion dated Sep. 12, 2019; 1-16 pages.

* cited by examiner

METHOD AND SYSTEM FOR ADDITIVE MANUFACTURING

BACKGROUND

The subject matter disclosed herein relates to additive manufacturing, and more particularly, to support structures used to support printed parts during post-printing thermal processing.

Additive manufacturing, also known as 3D printing, generally involves printing an article one layer at a time using specialized systems. In particular, a layer of a material (e.g., a metal and/or ceramic powder bed) is generally deposited on a working surface and bonded with another layer of the same or a different material. Additive manufacturing may be used to manufacture articles (e.g., fuel nozzles, fuel injectors, turbine blades, etc.) from computer aided design (CAD) models using techniques such as, but not limited to, metal laser melting, laser sintering, and binder jetting. These additive manufacturing techniques melt, sinter, and/or chemically bind layers of material to generate the desired article. Additive manufacturing facilitates manufacturing of complex articles and enables enhanced flexibility for customization of articles compared to other manufacturing techniques, such as molding (e.g., cast molding, injection molding). Additionally, additive manufacturing can reduce the overall manufacturing costs associated with generating these complex articles compared to molding techniques generally used.

BRIEF DESCRIPTION

In one embodiment, a binder jet printed article includes a part having a top portion, a bottom portion, and an overhang extending from the top portion and a support structure formed around the part that may block deformation of the part during post-printing thermal processing. The support structure includes a skid positioned adjacent to the bottom portion that may support the part, a first plurality of support features disposed along an outer perimeter of the skid, and a second plurality of support features disposed on the top portion of the printed part. The first and second plurality of support features form a lattice around the printed part such that the printed part is nested within the support structure.

In a second embodiment, a method, includes printing a green body article including a part and a support structure using a binder jet printing process. The support structure includes a first plurality of support features and a second plurality of support features oriented orthogonal to the first plurality of support features, and the part is nested within the support structure. The method also includes performing post-printing thermal processing of the green body article, including debinding the green body article to generate a brown body article; and sintering the brown body to generate an intermediate consolidated article. The support structure supports one or more regions of the part to block deformation of the part during post-printing thermal processing. The method also includes removing the support structure from the intermediate consolidated article to yield a consolidated part.

In a third embodiment, a consolidated part manufactured via the steps of printing a green body article including a part that is integrated with a support structure using a binder jet printing process. The support structure includes a plurality of support features forming a lattice around the part. The steps also include performing post-printing thermal processing of the green body article, including debinding the green body article to generate a brown body article and sintering the brown body to generate an intermediate consolidated article. The support structure supports one or more regions of the part to block deformation of the part during post-printing thermal processing. The steps also include removing the support structure from the intermediate consolidated article to yield the consolidated part.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
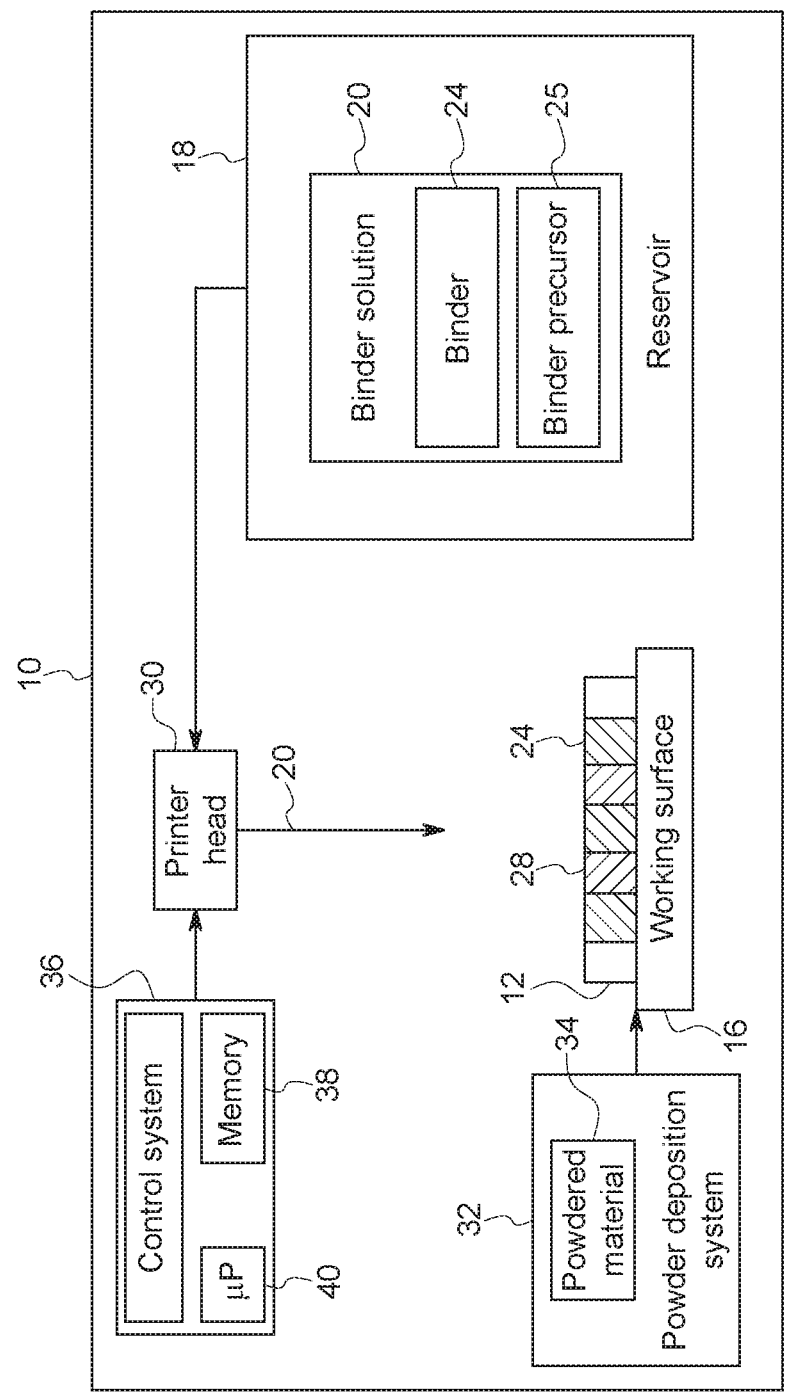
FIG. 1 is a block diagram of an embodiment of a binder jet printer used to print an article that includes a part and an associated support structure, in accordance with an embodiment of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

As used herein, a "working surface" is intended to denote a surface onto which a powder bed layer or a binder solution is deposited onto during a binder jet printing processes. The working surface may include a working platform of a binder jet printer, a layer of powder, or a binder printed layer. As defined herein, the term "article" is intended to denote a binder jet printed structure that includes both a part and an associated support structure at any stage in the fabrication process (e.g., before and after debinding, before and after sintering). As defined herein, the term "green body article" or "green body part" is intended to denote an article or part that has not undergone a debinding heat treatment to remove the binder. As defined herein, the term "brown body article" or "brown body part" is intended to denote an article or part that has undergone a debinding heat treatment to remove the binder, and has not yet undergone a sintering heat treatment. As defined herein, the term "consolidated intermediate article" is intended to denote an article (including both a consolidated part and an associated support structure) that has undergone a sintering heat treatment to consolidate the layers. As defined herein, the term "consolidated part" is intended to denote the consolidated intermediate article after the support structure has been removed.

There are numerous techniques for manufacturing articles, such as metal and ceramic parts used in a variety of machinery. For example, molding techniques, such as sand molding, cast molding, and/or injection molding, among others, may be used to manufacture metal and ceramic parts for machinery applications. As noted above, other techniques that may be used to manufacture metal and ceramic parts include additive manufacturing. For example, additive manufacturing techniques that may be used to manufacture articles include, but are not limited to, laser melting, laser sintering, and binder jetting. Additive manufacturing can be advantageous for fabricating parts compared to molding techniques due, in part, to the increased flexibility of materials that may be used, the enhanced ability to manufacture complex articles, and reduced manufacturing costs.

As mentioned, binder jetting uses a binder to bond particles of the material into layers that form a green body part. The binder (e.g., a polymeric adhesive) may be selectively deposited onto a powder bed in a pattern representative of a layer of the article being printed. Each printed layer is cured (e.g., via heat, light, moisture, solvent evaporation, etc.) after printing to bond the particles of each layer together to form the green body article. After the green body article is fully formed, the binder is thermally removed to form a brown body article. Following removal of the chemical binder, the brown body part is sintered to consolidate the build layers and form an intermediate consolidated part. Finally, the support structure of the article is removed from the intermediate consolidated part to generate the final consolidated part.

Accordingly, an article may undergo a number of heat treatments during fabrication. As defined herein, the term "post-printing thermal processing" is intended to denote a thermal process that includes heating a binder jet printed article to a debinding temperature or above. As such, post-printing thermal processing includes debinding and sintering heat treatments. During debinding, a green body article is heated above a debinding temperature (e.g., above about 200 Celsius (° C.)) to remove the binder and generate a brown body article. During sintering, the brown body part is heated to a sintering temperature of the powder (e.g., above approximately 1000° C.) to enable consolidation of the material (e.g., metal or ceramic particles) in the build layers. During post-printing thermal processing, especially during sintering, thermally induced processes can result in distortion of the final consolidated part.

For example, debinding shrinkage results during debinding as the binder is removed from the green body article. Additionally, sintering an article to consolidate the build layers causes volumetric shrinkage and densification of the article. The shrinkage of the article may result in distortion of certain structural features (e.g., an overhang, airfoil, or the like) in the final consolidated part. Additionally, gravitational forces may induce warping or sagging of certain structural features of the part during debinding and/or sintering. These distortions may affect the overall geometry of the consolidated part in a manner that renders the consolidated part unsuitable for use. Moreover, compared to parts having simple and non-complex geometries, parts having complex geometries are generally more prone to thermally-induced distortions during post-printing thermal processing. Therefore, in the absence of the present disclosure, the geometry and complexity of binder jet printed articles is limited due, in part, to undesirable distortion of the part during post-printing thermal processing. It is presently recognized that distortion of printed parts having complex geometries or expected to have a large amount of distortion (e.g., greater than approximately 20% distortion) can be effectively mitigated by using a support that retains the overall part geometry while also enabling dimensional changes of the part during post-printing thermal processing.

Disclosed herein are support structures that may be used to provide support within binder jet printed articles during post-printing thermal processes to mitigate distortion of certain structural features of the printed part, and to generally facilitate manufacture of articles having complex geometries. As discussed in further detail below, the support structures of the articles disclosed herein may be printed along with the part, such that at least a portion of the support structures are attached to or integral with the parts. However, in other embodiments, the support structures are printed or manufactured separately. The support structures provide support to one or more regions of the parts that may undergo thermally induced distortion during post-printing thermal processing. In addition to supporting one or more regions of the printed part, in certain embodiments, the support structures undergo dimensional changes (e.g., volume changes) similar to dimensional changes experienced by the parts during post-printing thermal processing. The ability of the support structures to undergo dimensional changes in a manner similar to the part allows the support structures to mitigate distortion of the part by providing support to the desired regions throughout the transition from a green body article to an intermediate consolidated part via debinding and sintering. Therefore, the presently disclosed support structures may be used to mitigate distortion during post-printing thermal processes of binder jet printed parts having complex geometries, which can reduce manufacturing cost and improve production yields.

With the foregoing in mind, FIG. 1 is a block diagram of a binder jet printer 10 that may be used to print an article that includes a part having complex geometries and an associated support structure. As mentioned, the support structure generally supports and maintains certain structural features of the part during post-printing thermal processing. In operation, the binder jet printer 10 selectively deposits a binder into the portion of a layer 12 of powder that is used to print the article, in accordance with embodiments of the present approach. In the illustrated embodiment, the binder jet printer 10 includes a working platform 16 (e.g., a stage) that supports the layer 12 of powder, a reservoir 18 that stores a binder solution 20 having a binder 24 and/or or binder precursor 25, a printer head 30 that is fluidly coupled to the reservoir 18, and a powder deposition system 32 that deposits a powdered material 34 to form the layer 12 of powder. In certain embodiments, the binder precursor 25 includes monomers that may be polymerized in situ on the layer 12 of powder after deposition to form the binder 24. The binder solution 20 may include additional components such as, but not limited to, wetting agents, viscosity modifiers, or the like. The printer head 30 selectively deposits the binder solution 20 into the layer 12 of powder to print (e.g., selectively deposit) the binder 24 onto and into the layer 12 in a pattern that is representative of the layer of the part being printed.

The illustrated binder jet printer 10 includes a control system 36 for controlling operation of the binder jet printer 10. The control system 36 may include a distributed control system (DCS) or any computer-based workstation that is fully or partially automated. For example, the control system 36 can be any device employing a general purpose computer or an application-specific device, which may generally include memory circuitry 38 storing one or more instructions for controlling operation of the binder jet printer 10. The memory 38 may also store CAD designs representative of a structure of the article being printed. The processor 40 may include one or more processing devices (e.g., a microprocessor), and the memory circuitry 38 may include one or more tangible, non-transitory, machine-readable media collectively storing instructions executable by the processor 40 to enable the functionality described herein.

Figure 2:
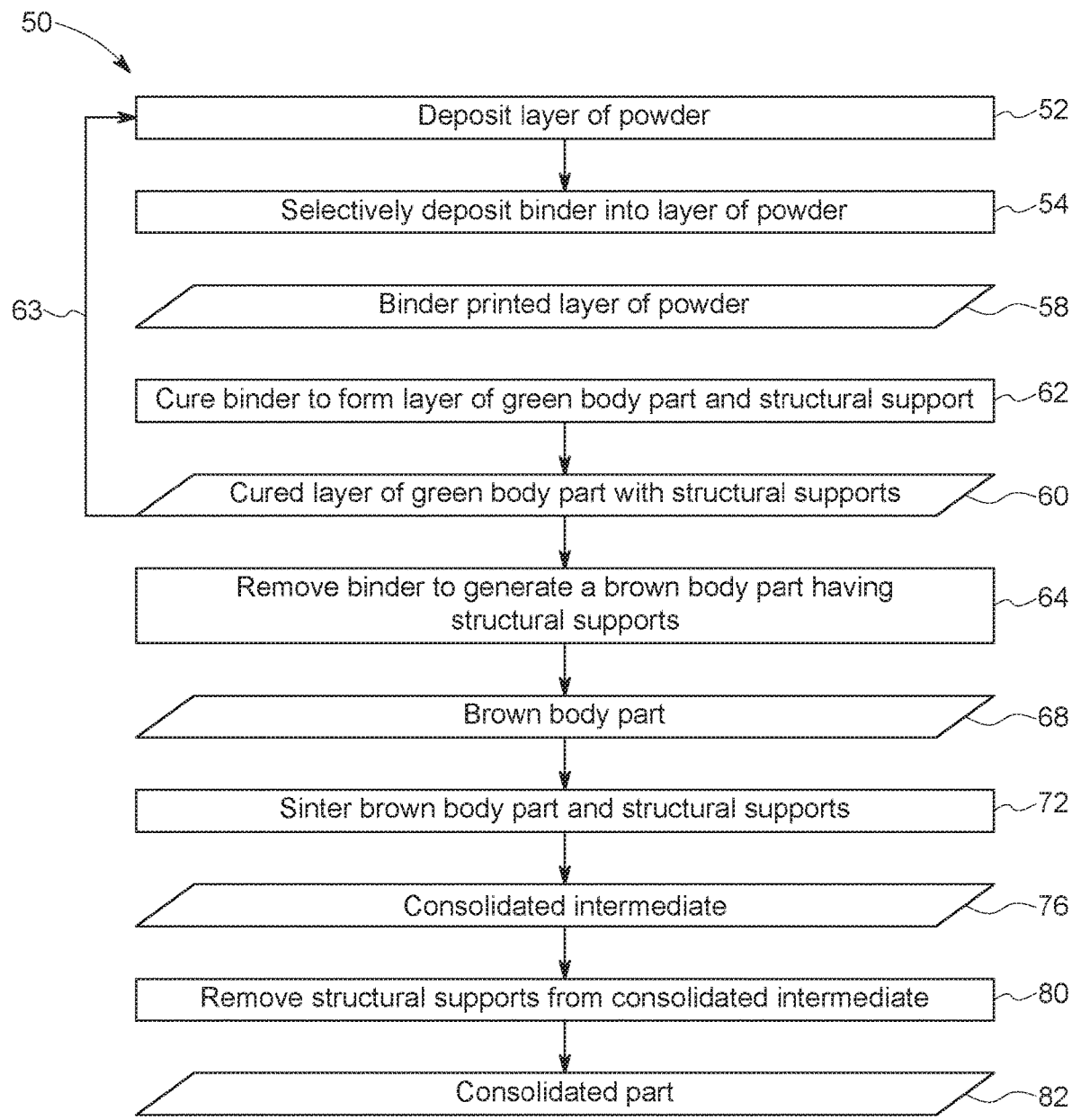
FIG. 2 is a flow diagram of an embodiment of a method of manufacturing the article using a binder jet printing process, in accordance with an embodiment of the present disclosure.

FIG. 2 is a block diagram depicting a method 50 for manufacturing an article via binder jet printing, wherein the article includes a part and a structural support to mitigate distortion of the part during post-printing thermal processes, in accordance with embodiments of the present approach. Certain aspects of the method 50 are executed by the processor 40 according to instructions stored in the memory 38 of the control system 36. The method 50 begins with depositing (block 52) a layer 12 of the powdered material 34 that is used to manufacture an article of interest. For example, the layer 12 (e.g., a powder bed) of the powdered material 34 is deposited on a working surface. For example, in certain embodiments, the working surface may be the working platform 16 of the binder jet printer 10 (e.g., when the layer 12 is the first layer of the green body article). In other embodiments, the working surface may be a previously printed layer. The powdered material 34 may be deposited onto the working surface using the powder deposition system 32. In certain embodiments, the powder deposition system 32 deposits the layer 12 such that the layer 12 has a thickness of between approximately 10 microns (m) and approximately 200 m (e.g., approximately 40 m or less). However, in other embodiments, the thickness of the layer 12 may be any suitable value.

The part of the article may include a variety of parts having complex, 3D shapes, such as, but not limited to, fuel tips, fuel nozzles, shrouds, micro mixers, turbine blades, or any other suitable part. Therefore, the powdered material 34 used to print the article may vary depending on the type and the end use of the part (e.g., gas turbine engines, gasification systems, etc.). The powdered material 34 may include any suitable metallic and/or non-metallic materials. By way of non-limiting example, the material 34 may include: nickel alloys (e.g., INCONEL® 625, INCONEL® 718, René® 108, René® 80, René® 142, René® 195, and René® M2, Marm-247); cobalt alloys (e.g., Haynes® 188 and L605); cobalt-chromium alloys, cast alloys: (e.g., X40, X45, and FSX414), titanium alloys, aluminum-based materials, tungsten, stainless steel, metal oxides, nitrides, carbides, borides, aluminosilicates, ceramics, or any other suitable material and combinations thereof. In certain embodiments, the material 34 includes particles having a particle size distribution (e.g., $d_{50}$) that is between approximately 1 micron ($\mu$m) and approximately 75 am. However, in other embodiments, the powdered material 34 may utilize particles of any other suitable particle size distribution.

Returning to FIG. 2, following deposition of the layer 12 of powder, the method 50 continues with selectively depositing (block 54) the binder 24 into portions of the layer 12 according to a predetermined pattern to generate a binder printed layer of powder 58. For example, the binder 24 may be selectively printed into the layer 12 of powder using the printer head 30 illustrated in FIG. 1. As mentioned, the printer head 30 is generally controlled (e.g. operated, guided) by the control system 36 based on a CAD design, which includes a representation of the layer 12 of the part being printed.

The binder 24 may be selected from a class of thermoplastic or thermoset polymers that include, but are not limited to, polymers derived from unsaturated monomers. For example, the binder 24 may one or more polymers have the following formulas: $(CH_2CHR)_n$, where R=a proton (—H), hydroxyl (—OH), phenyl, alkyl, or aryl unit. The binder 24 may also include one or more mono-functional acrylic polymers having the formula $(CH_2—CR^2COOR^1)_n$, where $R^1$=an alkyl or aryl unit, and $R^2$=a —H or methyl (—$CH_3$) unit; di-acrylic polymers having the formula $[(CH_2—CR^2COO)_2—R^3]n$, where $R^2$=a —H or —$CH_3$ unit and $R^3$=a divalent hydrocarbon radical; tri-acrylic polymers having the following formula $[(CH_2CR^1COO)_3—R^4]n$, where $R^1$=—H or —$CH_3$ and $R^4$=a trivalent hydrocarbon radical and/or poly(alkylene carbonates) including co-polymeric alkylene carbonates, such as poly(ethylene-cyclohexene carbonate), poly(ethylene carbonate), poly(propylene carbonate, poly(cyclohexane carbonate), among others. In certain embodiments, the binder 24 may include poly(methylmethacrylate) (PMMA), polystyrene (PS), poly(vinyl alcohol) (PVA); poly(alkylene carbonates), for example QPAC® 25, 40, 100, and 130 from Empower Materials (located in New Castle, Del.), and polymers derived from hexanediol diacrylate (HDDA), trimethylolpropane triacrylate (TMPTA, for example, SR351 from Sartomer of Exton, Pa.), and diethylene glycol diacrylate (DGD).

As discussed above with reference to FIG. 1, the printer head 30 receives the binder solution 20 (e.g., ink) having the binder 24 and selectively prints (e.g., deposits, flash vaporizes and condenses) the binder 24 into portions of the layer 12 of powder. Accordingly, the binder solution 20 may have certain properties that facilitate binder jet printing via the printer head 30. The binder solution 20 may include additives that facilitate deposition of the binder 24 into the layer 12. For example, in certain embodiments, the binder solution 20 includes one or more additives, including but not limited to: viscosity modifiers, dispersants, stabilizers, surfactants (e.g., surface active agents) or any other suitable additive that may facilitate jettability of the binder solution 20 and selective deposition of the binder 24 into the powder layer 12.

For example, in certain embodiments, the binder solution 20 may include surfactants. The surfactants may be ionic (e.g., zwitterionic, cationic, anionic) or non-ionic, depending on the properties of the binder 24 and/or the material 34, in different embodiments. By way of non-limiting example, the surfactant may be polypropoxy diethyl methylammonium chloride (e.g., VARIQUAT® CC-42NS, available from Evonik located in Essen, Germany) and/or a polyester/ polyamine condensation polymer (e.g., Hypermer KD2, available from Croda Inc. located in Snaith, United Kingdom), in certain embodiments. In certain embodiments, the one or more additives may improve the wettability of the material 34 to facilitate coating the particles of the powder with the binder 24. The one or more additives may also change (e.g., modify) the surface tension of the binder solution 20 to facilitate jettability of the binder solution 20. For example, in certain embodiments, the binder solution 20 is generally considered jettable if the Ohnesorge number (e.g., the ratio of viscous forces to inertial and surface tension forces) is between approximately 0.1 and approximately 1.

In certain embodiments, the one or more additives may also include a solvent that dissolves the binder 24. The solvent may be aqueous or non-aqueous, depending on the selected binder 24, as well as other additives that may be in the binder solution 20. The solvent is generally non-reactive (e.g., substantially inert) such that it does not react with the powder material 34 (e.g., metal and/or ceramic powder), the binder 24, or any other additives that may be in the binder solution 20. Additionally, in general, the solvent should readily evaporate after selective deposition of the binder 24 into the powder layer 12, which may facilitate curing to bond together the binder-coated particles of the printed layers 58. Example solvents of the binder solution 20 include, but are not limited to, water, methylene chloride ($CH_2Cl_2$), chloroform ($CHCl_3$), toluene, xylenes, mesitylene, anisole, 2-methoxy ethanol, butanol, diethylene glycol, tetrahydrofuran (THF), methyl ethyl ketone (MEK), trichloroethylene (TCE), or any other suitable solvent.

Following deposition of the layer 12 and the selective printing of the binder 24, as set forth in blocks 52 and 54 of FIG. 2, the illustrated method 50 continues with curing (block 62) the binder 24 to form a cured layer of the green body article 60, which includes both a green body part and an associated support structure. For example, as discussed above, the selectively deposited binder solution 20 may be a mixture of the binder 24 (e.g., polymer) and a solvent. The binder 24 coats particles in the powder layer 12, thereby generating binder-coated particles within the powder layer 12. While a portion of the solvent in the binder solution 20 may be evaporated during deposition (e.g., printing) of the binder 24, a certain amount of the solvent may remain within the layer 12 of powder. Therefore, in certain embodiments, the green body article 60 may be thermally cured (in a subsequent, post-print step) at a temperature that is suitable for evaporating the solvent remaining in the printed layer 58 and allows for efficient bonding of the printed layers 58 of the green body article 60. After curing, the binder 24 bonds the binder-coated particles (e.g., to one another, to the working surface) according to the printed pattern of binder solution 20 to form the binder printed layer of powder of a green body article 60.

In certain embodiments, the layer 58 of the green body article 60 may be cured via polymerization, wherein reactive monomers in the binder solution 20 polymerize to yield the binder 24. For example, the binder 24 may be polymerized in situ after selectively printing the binder solution 20 into the powder layer 12. Following deposition of the binder solution 20, the one or more binder precursors 25 (e.g., polymerizable monomers) in the binder solution 20 may be cured (e.g., reacted, cross-linked, polymerized) to form the printed layer 58 of the green body article 60. For example, in certain embodiments, the printed layer 58 may be exposed to heat, moisture, light, or any other suitable curing method that polymerizes the binder precursors 25 in the binder solution 20 to form the binder 24 in the printed layer 58. In certain embodiments, the binder solution 20 may include a radical initiator (e.g., azobisisobutyronitrile (AIBN)) to facilitate polymerization of the one or more polymerizable monomers. In one embodiment, the binder solution 20 includes binder precursors selectively deposited into the powder layer 12 that cure (e.g., polymerize, cross-link) rapidly (e.g., on the order of seconds) without additional supplied energy.

The method 50 typically involves the repetition of the acts of blocks 52, 54, and 62, shown by arrow 63, to continue fabricating in a layer-by-layer manner until all of the layers of the entire green body article 60 have been printed. The binder 24 bonds (e.g., adheres, anchors, binds) each successive layer and provides a degree of strength (e.g., green strength) to the printed article to improve the integrity of the structure of the green body part during post-printing processes (e.g., debinding, sintering, etc.). That is, the green strength provided by the binder 24 maintains bonding between the powder material 34 within each of the layers, and blocks (e.g., resists, prevents) delamination of the layers during handling and post-printing processing of the green body article 60.

As discussed above the green body article 60 may undergo undesirable distortions during post-printing thermal processing (e.g., debinding and/or sintering). The distortions may include shrinkage, as well as sagging or warpage caused by gravitational forces during densification of the printed article. Accordingly, to mitigate undesirable distortions in the geometry of the printed part, present embodiments include a binder jet printed support structure that support regions of the part that may be prone to thermally induced distortions. This support structure is arranged on the article in a manner that facilitates removal of the support structure after the article undergoes post-printing processes to generate the final consolidated part. The support structure may include alignment features that align components of the part to a reference geometry and stabilize distortions of the part during debinding and/or sintering. As discussed, the support structure is attached to specific locations on the part to mitigate distortions, while also allowing the part to densify and achieve the intended shape and dimensions. As discussed in further detail below with reference to FIGS. 4-10, the support structure may include, for example, pillars/columns, stiffening features, ribs, skids, and the like.

In certain embodiments, the support structure is printed along with the part. That is, both the part and the support structure of the green body article are built together, such that the support structure and the part form a single unitary or monolithic article. After post-printing thermal processing (e.g., debinding and sintering), the support structure may be removed, for example, using a machining tool.

Once the desired number of printed layers 58 are deposited, the method 50 includes removing (block 64) the binder 24 from the printed green body article 60 to generate a brown body article 68. Like the green body article 60, the brown body article 68 includes having a support structure strategically positioned at specific locations, or regions, around the part to block distortions (e.g., warpage and sagging) that may be induced by post-printing thermal processing. For example, the printed green body part 60 may be heated to a temperature that is approximately 500° C. or less, such as between approximately 250° C. and approximately 450° C., to facilitate removal of the binder 24. The conditions to which the printed green body article 60 is exposed during debinding (e.g., removal of the binder 24 from the printed layers of the printed green body part 60) decomposes the binder 24 into smaller molecules that may be readily released from the printed green body article 60, yielding the brown body article 68 having a substantial portion (e.g., approximately 95%, approximately 96%, approximately 97%, approximately 98%) of the binder 24 removed. In certain embodiments, a portion of the binder 24 and/or decomposition products of the binder 24 (e.g., oxides, such as silicon oxide) may remain in the brown body article 68 and may improve bonding of the powder material 34 within the brown body article 68, enabling an improved brown strength that maintains the structure of the brown body part 68 during handling between debinding and sintering.

The method 50 illustrated in FIG. 2 includes sintering (block 72) the brown body article 68 to consolidate the powder material 34 to generate a consolidated additively manufactured intermediate article 76. During sintering, the brown body article 68 is generally exposed to a concentrated source of energy (e.g., a laser, electron beam, or any other suitable energy source) that heats the brown body article 68 and consolidates (e.g., densifies, connects) the powdered material 34 of the printed layers of the brown body article 68 to form the consolidated intermediate article 76 (e.g., substantially solid part) having a density that is greater than the density of the brown body article 68. Sintering imparts strength and integrity to the brown body article 68, such that a consolidated part, once separated from the support structure, is suitable for use in machinery for its intended application (e.g., as a component of a gas turbine engine or a gasification system). The sintering temperature is a temperature that is generally less than (e.g., approximately 30% of) a melting point of the powdered material 34, such that the particles of the powdered material 34 soften and form connections (e.g., necks or bridges) that bind together neighboring particles in the brown body part 68. In general, sintering temperatures may be in excess of 1000° C., depending on the properties of the powder material 34 used to fabricate the part. For example, in certain embodiments, when the powdered material 34 is a nickel alloy (e.g., INCONEL® 625), the sintering temperature may be between approximately 1250° C.-1270° C.

Following sintering of the brown body article 68 to form the consolidated intermediate article 76, the method 50 includes removal (block 80) of the support structure from the consolidated intermediate article 76, resulting in the consolidated part 82. For example, the support structure may be removed by a subtractive process such as, but not limited to, machining, dissolution, etching, laser cutting, or any other suitable process that enables separation of the support structure from the consolidated intermediate 76.

In certain embodiments, the support structure of the article may have a different composition relative to the part. For example, the support structure and the part may be printed using different types of powdered material 34. For example, the support structure may be printed using a powdered material having different sintering properties than the powdered material 34 used to print the part. During sintering, a surface area-to-volume ratio between the support structure and the brown body part within the brown body article 68 changes, such that the support structure pulls away from the printed part during sintering. For example, a sintering temperature for the support structure may be higher than the sintering temperature for the part of interest. The difference in the sintering temperatures results in the part shrinking earlier than the support structure. The difference in a rate of densification between the support structure and the part may result in breakage or separation of the support structure from the part, thereby forming the consolidated part 82. In other embodiments, the material used to print the support structure results in a strength of the support structure in the consolidated intermediate article 76 being less than that of the consolidated part. As such, the support structures may be easier to cleave or break away from the consolidated intermediate part 76. In one embodiment, discussed in further detail below with reference to FIG. 12, a spacer may be deposited between the support structures and the part to be supported, such that the support structures are not in direct contact with the part during post-printing processing. The spacer may include materials that are non-reactive and compatible with the powdered material 34, and are easily removed without affecting the integrity of the consolidated part 82.

In certain embodiments, the support structure and the part may be printed using different binders 24. For example, the support structure may be printed with a binder includes an anti-sintering agent. The anti-sintering agent may prevent at least a portion of the support structure from consolidating such that the support structure can be easily removed from the consolidated part 82.

Figure 3:
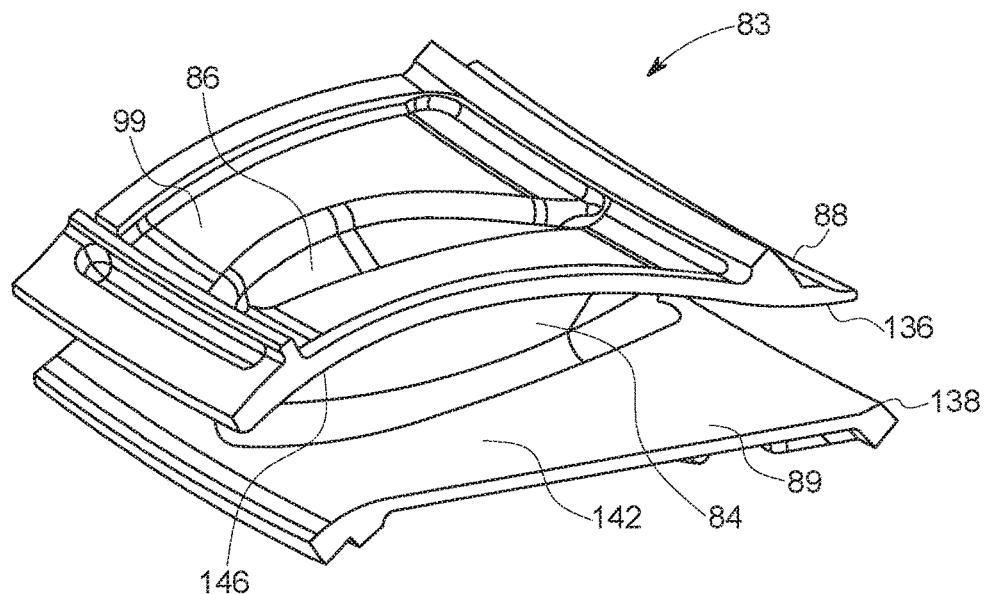
FIG. 3 is a perspective view of an example consolidated part having a complex geometry, in accordance with an embodiment of the present disclosure.

FIG. 3 is a perspective side view of an embodiment of the consolidated part 82 generated according to the acts of the method 50 in FIG. 2. In the illustrated embodiment, the consolidated part 82 includes a central body 84 having an airfoil 86, an overhang 88, and a flange-like base 89. As discussed above, certain structural features of a part (e.g., the airfoil 86, the overhang 88, and/or the flange-like base 89) may deform or sag during post-printing thermal processing (e.g., debinding and/or sintering) due, in part, to gravitational forces and/or shrinkage. However, as discussed in further detail below, with reference to FIGS. 4-9, deformation of the consolidated part 82 resulting from post-printing thermal processing may be mitigated by positioning portions of the support structure in regions prone to deformation, such as the airfoil 86, the overhang 88, and the flange-like base 89.

Figure 4:
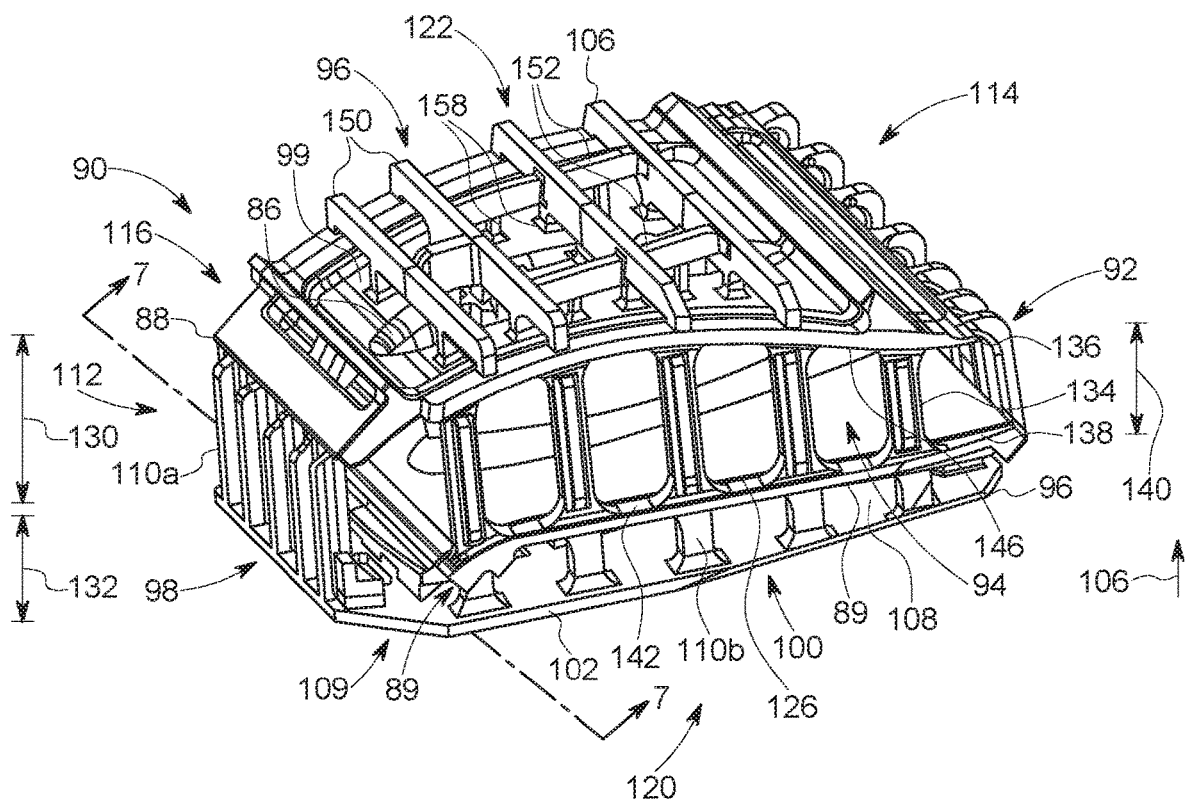
FIG. 4 is a perspective view of an article that includes the part of FIG. 3 disposed within an example support structure having pillars and ribs that form a cage-like housing about the part, in accordance with an embodiment of the present disclosure.
Figure 5:
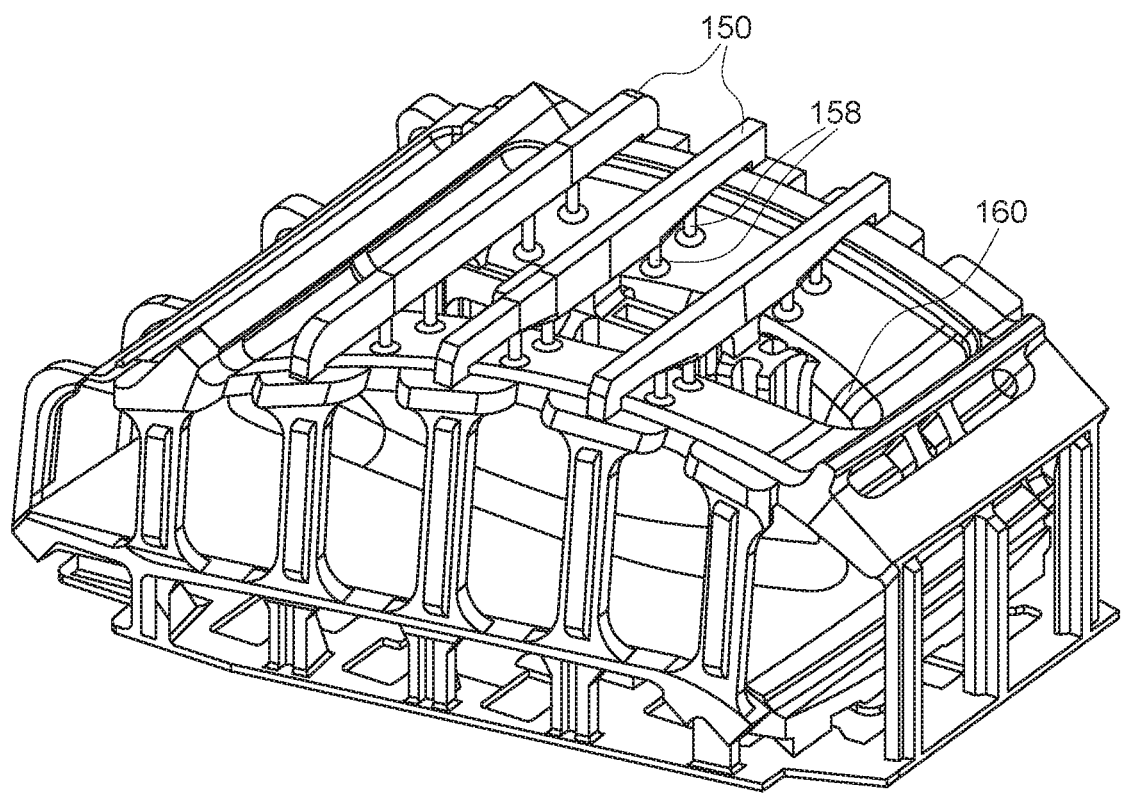
FIG. 5 is a perspective view of an article that includes the part of FIG. 3 and another example support structure having ribs with multiple protrusions, in accordance with an embodiment of the present disclosure.

For example, FIG. 4 illustrates a binder jet printed article 90, in accordance with embodiments of the present approach. The illustrated article 90 includes a support structure 92 (e.g., a scaffold), as well as a supported part 94 nested within the support structure 92. It may be appreciated that the binder jet printed article 90 may generally be illustrative of embodiments of either the green body article 60 (including a green body form of the part 82 of FIG. 3), the brown body article 68 (including a brown body form of the part 82 of FIG. 3), or consolidated intermediate article 76 (including the consolidated part 82 of FIG. 3). The support structure 92 includes a plurality of support features 96, 98 positioned at various locations on an outward facing surface 99 of the supported part 94. As discussed above, the support features 96, 98 support regions (e.g., the airfoil 86, the overhang 88, and/or the flange-like base 89) of the supported part 94 that may experience undesirable distortions (e.g., deformation, sagging, warpage) due, in part, to gravity during post-printing thermal processing. By way of non-limiting example, the illustrated support features 96, 98 include pillar, columns, ribs, and the like. The support features 96, 98 surround the supported part 94 and are arranged in a manner that provides support to regions of the supported part 94 that may be susceptible to deformation during post-printing thermal processing.

In the illustrated embodiment, the support structure 92 includes a skid 100 that provides stability against warpage and allows the supported part 94 to remain flat during post-printing thermal processing. For example, the skid 100 forms a platform 102 of the printed article 90. That is, the skid 100 is disposed below the supported part 94, such that the supported part 94 rests on the skid 100. A portion of the support features 98 extend from a top surface 108 of the skid 100. For example, pillars 110 (e.g., pillars 110a and 110b) perpendicularly extend away from the top surface 108 of the skid 100 and are arranged along an outer perimeter 109 of the skid 100.

The pillars 110 may vary in shape and length based on a geometry of the supported part 94, the location of the regions to be supported, and the arrangement of the supported part 94 within the support structure 92. In the illustrated embodiment, the pillars 110a are positioned at ends 112, 114 of the printed article 90. The pillars 110a extend from the top surface 108 of the skid 100 to a top portion 116 of the supported part 94, such that the pillars 110a support the overhang 88 of the part 94. As noted, without the pillars 110a of the support structure 92, the overhang 88 may deform during post-printing thermal processing due, in part, to gravitational forces. The pillars 110b are positioned on lateral sides 120, 122 of the printed article 90, and extend from the top surface 108 of the skid 100 to the flange-like base 89 of the supported part 94. The pillars 110b provide support to the flange-like base 89, thereby blocking warpage or sagging during post-printing thermal processing. While in the illustrated embodiment, the pillars 110b are positioned along the perimeter 109 on each respective side 120, 122, in certain embodiments, the skid 100 may include rows of the pillars 110b that extend across the top surface 108 of the skid 100, from the end 112 to the end 114 and the sides 120, 122. Therefore, the flange-like base 89 may be supported at various locations along its width and length. As discussed above, the pillars 110a support the overhang 88 at the top portion 116 of the supported part 94 and the pillars 110b support the flange-like base 89 of the supported part 94. Accordingly, the pillars 110a extend a distance 130 away from the skid surface 108 that is greater than a distance 132 of the pillars 110b, wherein the distance 130, 132 is based on the geometry of the supported part 94. In certain embodiments, the distance 130, 132 is between approximately 5 cm and 12 cm.

In addition to the pillars 110, the support structure 92 includes pillars 134 positioned on respective sides 120, 122 of the printed article 90 and extending along edges 136, 138 of the supported part 94, between a portion of the overhang 88 and the flange-like base 89. Similar to the pillars 110b, the pillars 134 provide support to the overhang 88 at the sides 120, 122. A dimension 140 of the pillars 134 is approximately equal to a distance between an upward facing surface 142 and a downward facing surface 146 of the supported part 94. Therefore, based on the geometry of the supported part 94, the dimension 140 of the pillars 134 may vary.

The support features 96 include a plurality of ribs 150, 152 positioned on the outward facing surface 99 of the supported part 94 between the ends 112, 114. The ribs 150 are positioned orthogonally relative to the ribs 152. For example, in the illustrated embodiment, the ribs 150 are spaced apart along the outward facing surface 99 of the supported part 94, from the end 112 to the end 114. Similarly, the ribs 152 are spaced apart along the outward facing surface 99, from the side 120 to the side 122, and are positioned between each rib 150. As such, the ribs 150, 152 form a grid-like pattern on the outward facing surface 99 of the supported part 94. The ribs 150, 154 include support pins 158, also referred to herein as pins or protrusions, that support certain regions of the outward facing surface 99 of the supported part 94. The pins 158 block sagging of the overhang 88 of the supported part 94 that may be caused by gravity during post-printing thermal processing. The pins 158 may have any suitable width and depth. In certain embodiment, the pins 158 may have a width of between approximately 0.1 in. and 0.5 in. and a depth of between approximately 0.1 in. and 1 in. depending on the size and geometry of the part 94.

In the illustrated embodiment, the ribs 150 include a single pin 158 on each side of the airfoil 86 of the supported part 94, such that the ribs 150 include two pins 158 along their respective length. Similarly, each rib 152 includes a single pin 158. However, the ribs 150, 152 may have any suitable number of pins 158 based on a width (e.g., a dimension orthogonal to ribs 152 and extending from the side 120 to the side 122) of the top portion 116 of the supported part 94. For example, the ribs 150, 152 may have 1, 2, 3, 4, 5, 6, 7, or more pins 158. In the embodiment illustrated in FIG. 5, the ribs 150 include two pins on each side of the airfoil 160.

Figure 6:
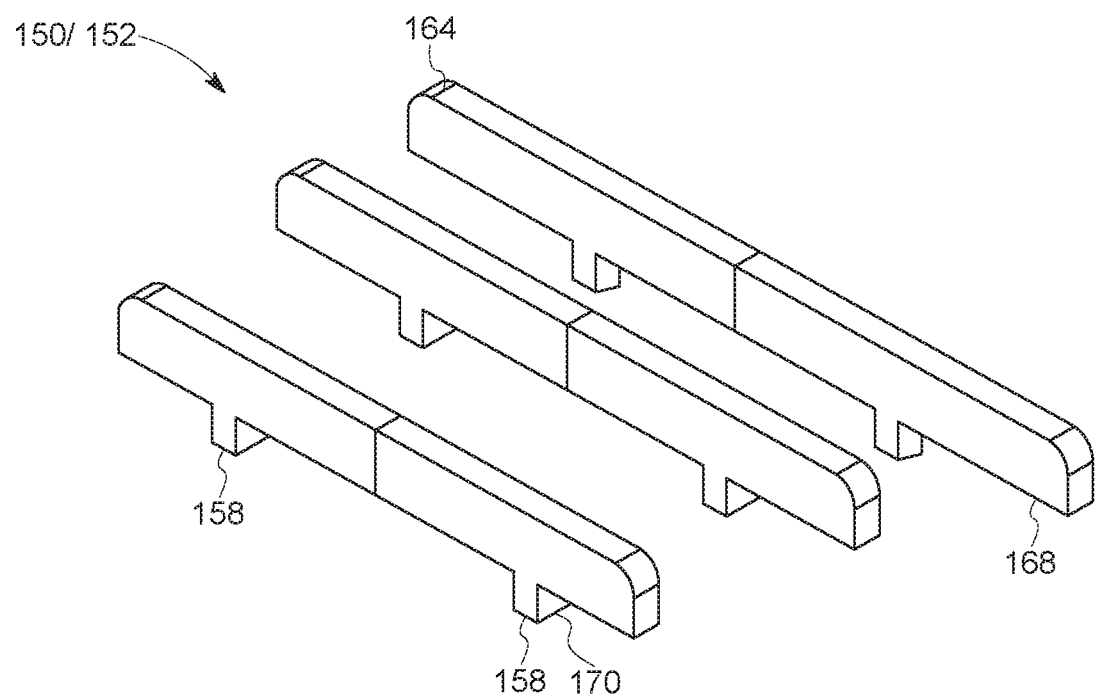
FIG. 6 is a diagram of a plurality of ribs used for the support structure of FIG. 4, each rib having a single protrusion, in accordance with an embodiment of the present disclosure.

FIG. 6 is an embodiment of the ribs 150, 152 having a single pin 158 (e.g., protrusion). As shown in the illustrated embodiment, the ribs 150, 152 have an outward facing surface 164 and an inward facing surface 168. The outward facing surface 164 is substantially free of protrusions. The inward facing surface 168 includes the pins 158. The pins 158 extend away from the inward facing surface 168 and are attached to the outward facing surface 99 of the part 94 at a terminus 170. The pins 158 may have any suitable shape that facilitates coupling and removal of the ribs 150, 152 to the part 94, while also providing support to the top portion 116 to mitigate sagging of structural features of the part 94 during post-printing thermal processing.

Figure 7:
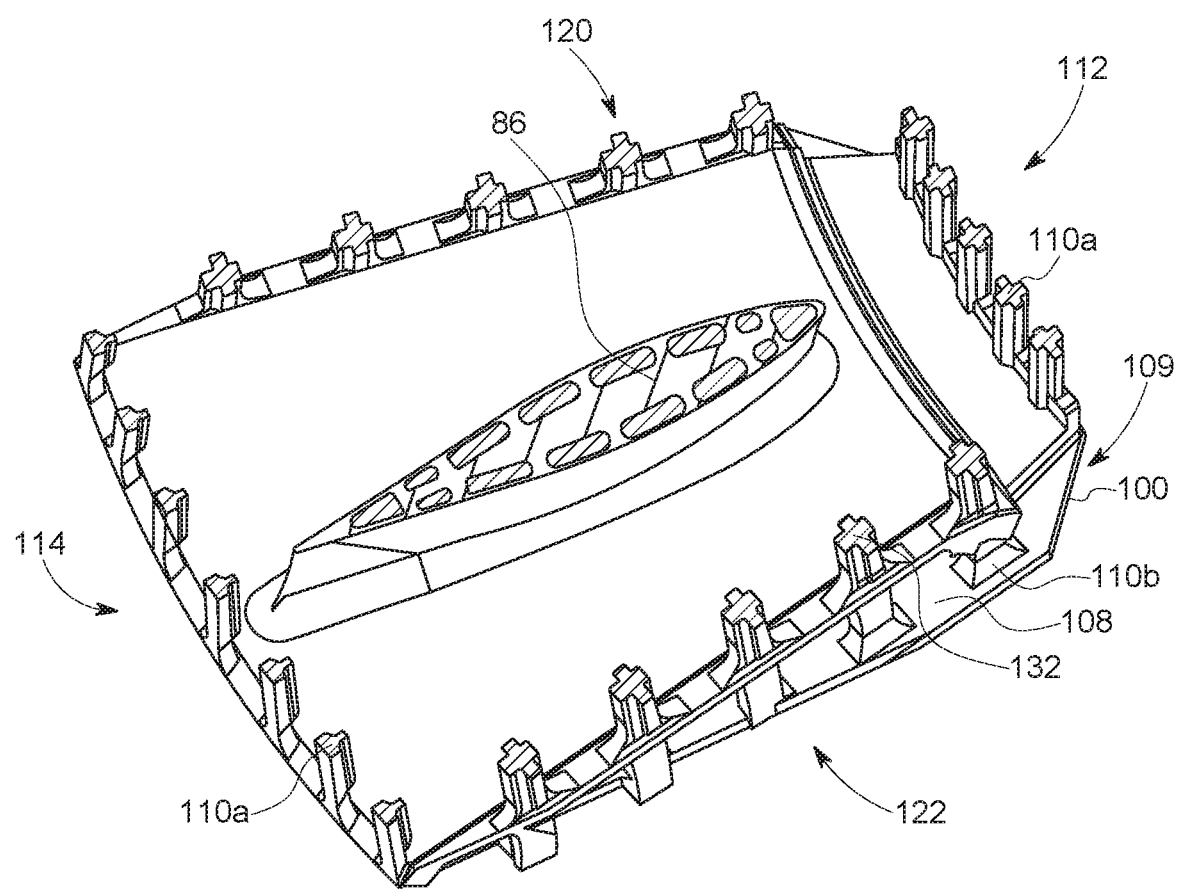
FIG. 7 is a cross-sectional view of a portion of an article having the part of FIG. 3 and another example of a support structure having pillars with variable cross-sections, in accordance with an embodiment of the present disclosure.

The pillars 110, 134 and the pins 158 may have any suitable shape that supports a desired load of the part 94 during post-printing thermal processing at the locations that are susceptible to deformation, and that facilitates removal of the support structure 92 after sintering to separate the support structure 92 from the consolidated intermediate article 76 and form the consolidated part 82. For example, a cross-sectional shape of the pillars 110, 134 and/or the pins 158 includes, but is not limited to, a circular shape, cross-shape, T-shape, L-shape, or any other suitable shape based on a stiffness requirement of the pillars 110, 134 and/or pins 158 for supporting the desired region of the part 94. FIG. 7 is a cross-sectional view of the printed article 90 along line 7-7 (see FIG. 4). In the illustrated embodiment, a portion of the pillars 110a positioned on the end 112 have a cross-shaped cross-section, and a portion of the pillars 110 positioned on the end 114 have a T-shaped cross-section. Similar to the pillars 110a on the end 112, the pillars 134 have a cross-shaped cross-section. Pillars having a cross-shaped cross-section may provide more stiffness compared to pillars having other cross-sectional shapes.

Figure 8:
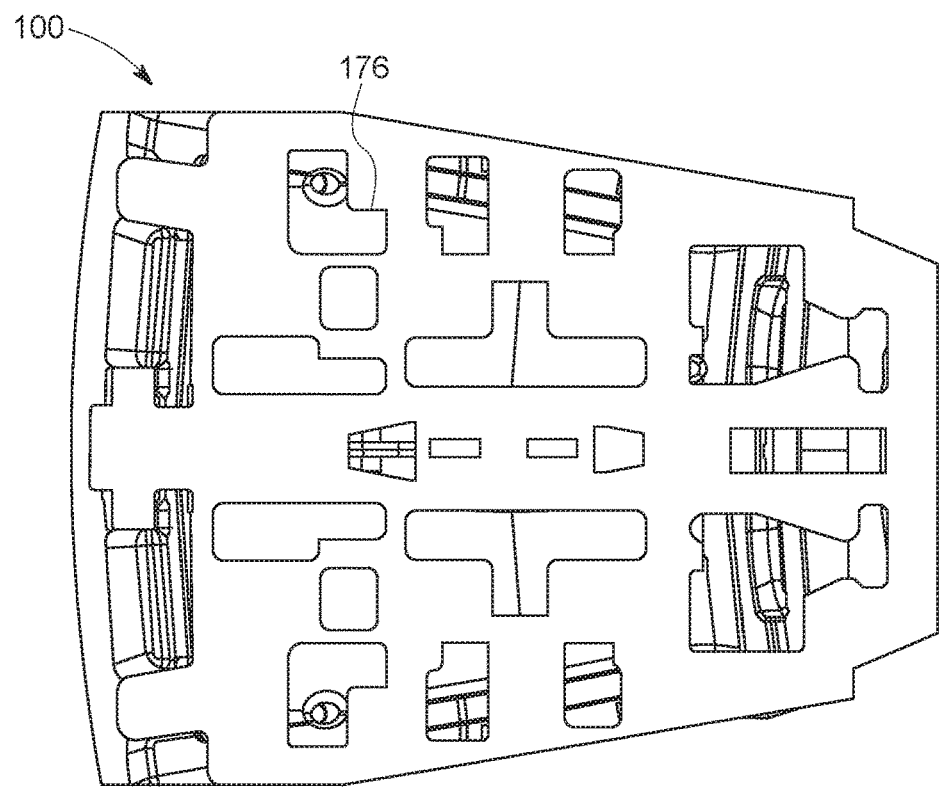
FIG. 8 is a top view of a skid base of the structural support of FIG. 7 having cutouts and/or holes, in accordance with an embodiment of the present disclosure.

As discussed above, the support structure 92 includes the skid 100 on which the supported part 94 rests during post-printing thermal processing. The skid 100 may have a thickness of at least approximately 2.0 centimeters (cm). For example, the thickness of the skid 100 may be between approximately 2.0 cm and 5 cm. However, it should be noted that the skid 100 may have a thickness greater than approximately 5 cm depending on the size and geometry of the supported part 94. In certain embodiments, the skid 100 may include cutouts or holes. For example, FIG. 8 is a top view of the skid 100 having cutouts 176, or holes, in accordance with an embodiment of the present disclosure. As discussed above, after the article undergoes post-printing thermal processing, the support structure 92 is detached from the supported part 94 to generate the consolidated part 82. Once removed, the support structure 92 may be discarded. Therefore, to reduce an amount of the powder used to print the support structure 92, which will be discarded, the skid 100 may include the cutouts 176, which reduce an amount of the powdered material 34 used to print the skid 100. The cutout 176 may have any suitable shape that allows the skid 100 to provide sufficient support for the supported part 94. Moreover, the geometry of the skid 100 may be based on the geometry of the part 94 being supported. In certain embodiments, the skid 100 may be printed along with the supported part 94, while in other embodiments, the skid 100 may be printed separately. For embodiments in which the skid 100 is printed separately, the skid 100 may be positioned underneath the part 94 before post-printing thermal processing.

Figure 9:
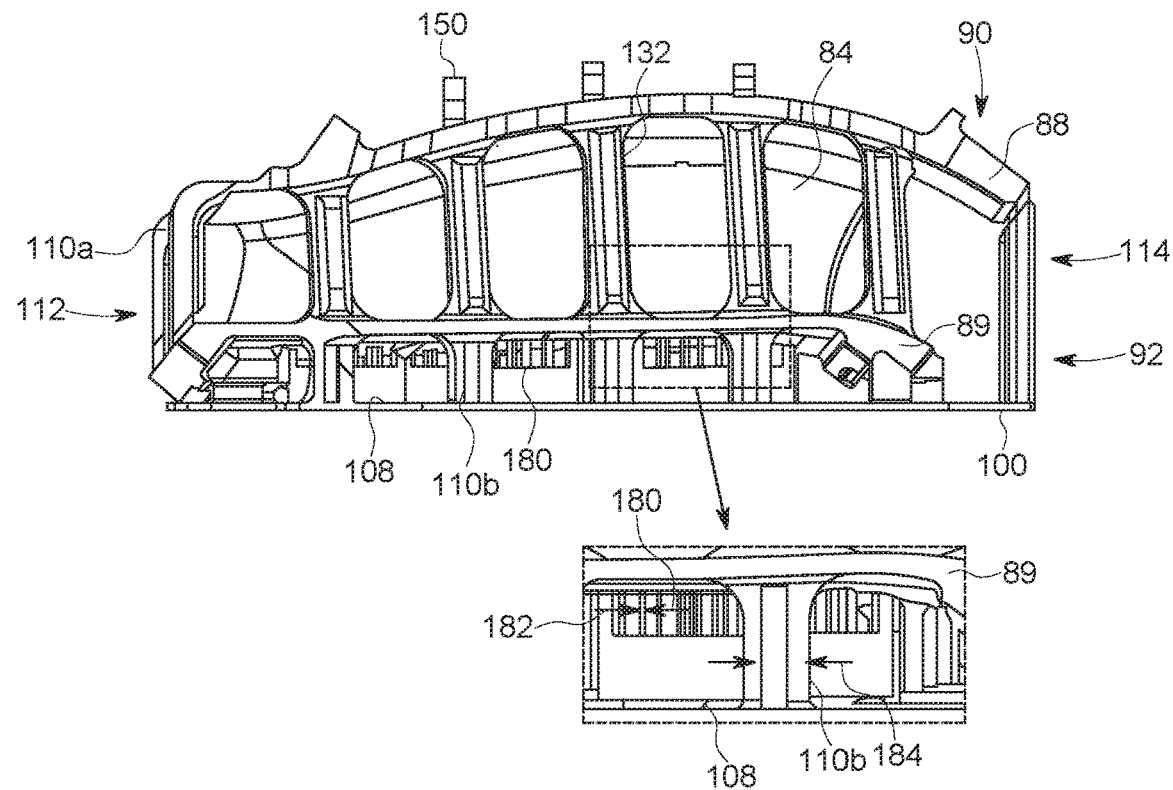
FIG. 9 is a side view of an article that includes the part of FIG. 3 and a support structure having support pins positioned along a downward facing surface, in accordance with an embodiment of the present disclosure.

In certain embodiments, the skid 100 may include support pins arranged on the top surface 108 of the skid 100 to mitigate sagging of the flange-like base 89 of the supported part 94. For example, FIG. 9 is a side-view of the printed article 90 having a plurality of support pins 180 arranged on the top surface 108 of the skid 100, in accordance with an embodiment of the present disclosure. The support pins 180 extend from between the top surface 108 and the flange-like base 89 of the supported part 94. Similar to the pillars 110, the support pins 180 may have any suitable cross-sectional shape that provides sufficient support to the supported part 94 and facilitates removal of the support structure 92 after the consolidated part 82 is formed. For the illustrated example, the support pins 180 may have a thickness 182 that is less than a thickness 184 of the pillars 110. For example, the thickness 182 may be between approximately 10% and 80% less thick than the thickness 184.

Figure 10:
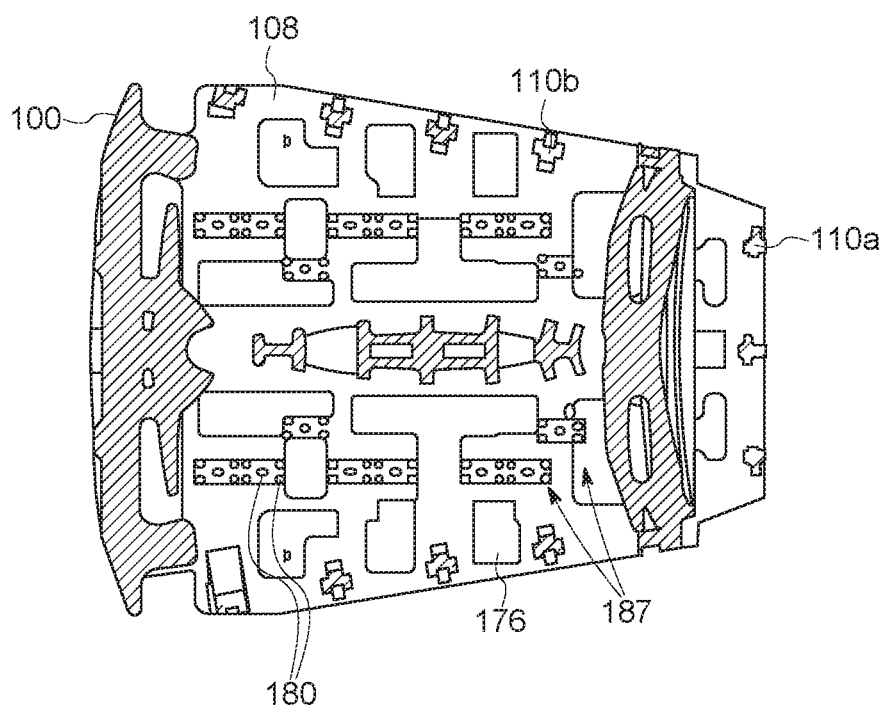
FIG. 10 is a top view of a skid for use with the support structure of FIG. 9 and having support pins arranged in clusters, in accordance with an embodiment of the present disclosure.

The support pins 180 may be arranged in rows and/or clusters along the top surface 108 of the skid 100. For example, FIG. 10 is a top view of the skid 100 having the support pins 180 arranged in clusters 187 at various locations along the top surface 108 of the skid 100. The clusters 187 may have any suitable number of support pins 180, such as but not limited to, 2, 3, 4, 5, 6, 7, 8, 9, 10 or more support pins 180. The number of support pins 180 in each cluster 186 may be determined based on the load supported and the geometry of the supported part 94. Similar to the pillars 110, 132, the support pins 180 may have any suitable cross-sectional shape, such as but not limited to, T-shaped, cross-shaped, circular, square, triangular, or any other suitable cross-sectional shape, and combinations thereof, that enable the supported part 94 to be supported, blocking (e.g., preventing, limiting) deformation of the supported part 94 during post-printing thermal processing.

Figure 11:
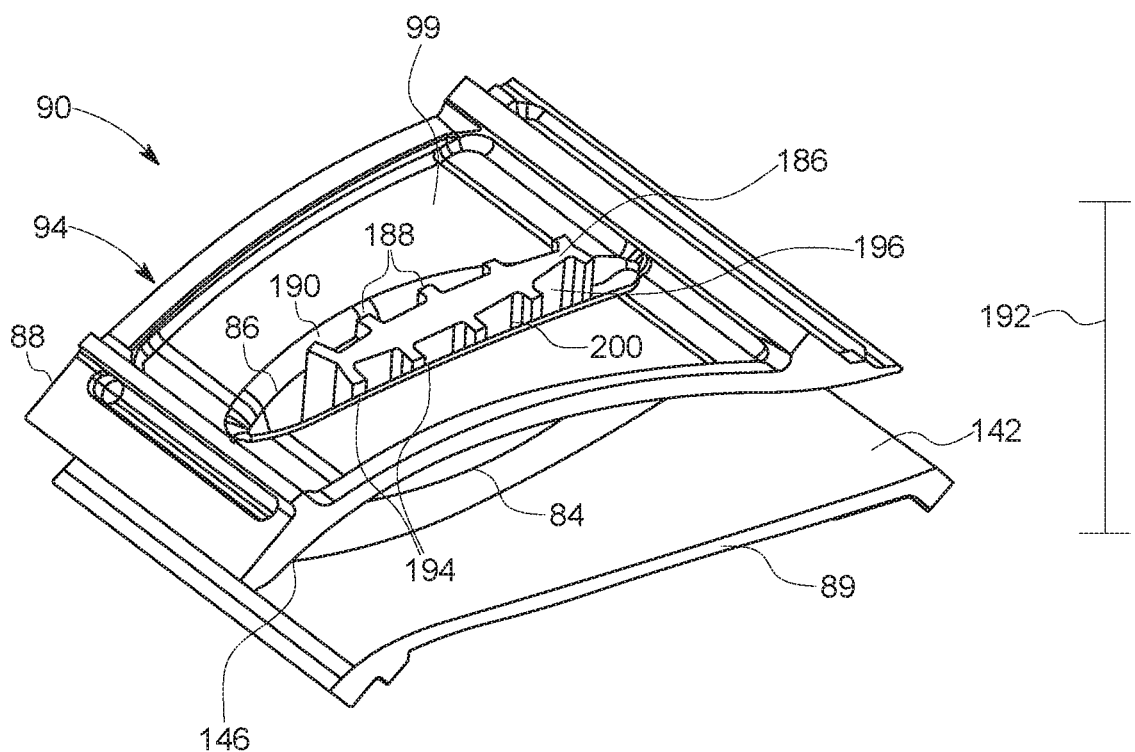
FIG. 11 is a perspective view of an article that includes the part of FIG. 3 and an example support structure that includes a core disposed within an airfoil of the part, in accordance with an embodiment of the present disclosure.

In addition to the pillars 110, 132, ribs 150, 152, and support pins 180, the support structure 92 also includes a support feature for the airfoil 86. For example, FIG. 11 is a perspective view of a portion of the printed article 90, wherein the airfoil 86 of the supported part 94 is supported by a core 186. As discussed above, the airfoil 86 may be subject to distortions during post-printing thermal processing. Accordingly, it may be desirable for the support structure 92 to include features that support the airfoil 86. For example, in the illustrated embodiment, the core 186 is positioned within the airfoil 86. The core 186 is shaped to conform to a shape of the airfoil 86, and includes a plurality of protrusions 188 that couple the core 186 to an inner surface 190 of the airfoil 86. In certain embodiments, the core 186 is printed from a material that is different from the material used to print the supported part 94. In other embodiments, the core 186 and the support structure 92 are printed from the same material. The core 186 extends along a length 192 of the airfoil 86 that extends from the outward facing surface 99 to the flange-like base 89.

For the printed article 90 of FIG. 11, the core 186 may be coupled to the airfoil 86 of the supported part 94, for example, by printing the core 186 along with the supported part 94. As shown in the illustrated embodiment, the attachment of the core 186 to the airfoil 86 is not continuous. For example, attachment points 194 between an outer surface 196 of the core 186 and the inner surface 190 of the airfoil 86 are spaced apart around a circumference of airfoil 86. As such, portions of the outer surface 196 are not in contact with the inner surface 190, thereby forming gaps 200 between each attachment point 194.

In certain embodiments, the core 186 is segmented. For example, the core 186 may include multiple pieces that, when combined, form the core 186. By segmenting the core 186, the core 186 may be easily removed in sections from the consolidated intermediate 76 when the remainder of the support structure 92 is removed to free to consolidated part 82. In one embodiment, the core 186 may have a sintering temperature that is greater than a sintering temperature of the supported part 94. Therefore, as the airfoil 86 of the supported part 94 shrinks, pressure is applied to the core 186 (which shrinks at a slower rate). The pressure applied by the support part 94 on the core 186 may cause the core 186 to break during sintering, thereby facilitating removal of the core 186 from the consolidated part 82.

Figure 12:
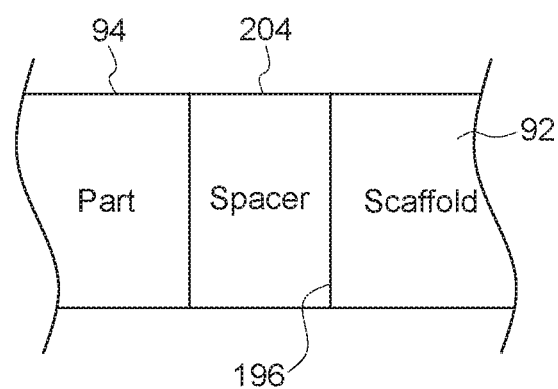
FIG. 12 is a schematic diagram of an article that includes a part, a support structure, and a spacer disposed between the part and the support structure, in accordance with an embodiment of the present disclosure.

Present embodiment of the disclosure also include using a spacer material between the support structure 92 and the supported part 94 within the printed article to facilitate separation of the support structure 92 from the supported part 94 after post-printing thermal processing to generate the consolidated part 82. FIG. 12 is a schematic diagram of the printed article 90 having a spacer 204 disposed between the support structure 92 and the supported part 94. The spacer 204 interfaces between the support structure 92 and the supported part 94, such that the support structure 92 is not directly attached (e.g., only indirectly attached) to the supported part 94. The spacer 204 may include a material that is different from the powdered material 34 used to print the support structure 92 and the supported part 94. The spacer 204 may include non-reactive materials (e.g., polymers, ceramics, and refractory materials) that are stable at temperatures above 1,000 degrees Celsius (° C.) and have different mechanical properties compared to the powdered material 34 to enable easy removal. For example, the spacer 204 may be removed by dissolving in water, an acidic solution, a caustic solution, or any other suitable liquid that does not affect the integrity of the consolidated part. Dissolution of the spacer 204 may facilitate removal and separation of the support structure 92 from the consolidated part 82.

As discussed above, binder jet printed articles may be fabricated that include a part that is integrated with a support structure (e.g., a scaffold) that provides support to the part during thermal post-printing processing. The disclosed support structure includes support features that are positioned and arranged in a manner that provides support to regions of the part that are prone to deformation due to shrinkage and/or gravitational forces during post-printing thermal processing. The support structure can be printed along with the part within the article, such that the support features of the support structure are fixedly attached to the part during the post-printing thermal processing. The support structure is separated from the print article during and/or after sintering the print article to generate the consolidated part. Printing the support structure along with the part enables the fabrication of support structures that shrink (e.g., densify) along with the part to accommodate for volume changes resulting from densification of the part. Moreover, printing the support structure and part together decreases an amount of handling of the printed part prior to post-printing thermal processing. In this way, the disclosed support structure provides support to the print article throughout the post-printing thermal processing to mitigate deformation of the final consolidated part.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
   printing a green body article including a part and a support structure using a binder jet printing process, wherein the part is nested within the support structure, wherein the support structure comprises a first plurality of support features and a second plurality of support features extending between and oriented orthogonal to the first plurality of support features, wherein the first plurality of support features and the second plurality of support features extend across and over a top surface of a top portion of the part, with respect to gravity, and wherein the support structure comprises a plurality of pins extending from the first plurality of support features, the second plurality of support features, or both, to the top surface to block sag and/or rise of the top portion during post-printing thermal processing;
   performing the post-printing thermal processing of the green body article, comprising:
      debinding the green body article to generate a brown body article; and
      sintering the brown body article to generate an intermediate consolidated article, wherein the support structure supports one or more regions of the part to block deformation of the part during the post-printing thermal processing; and
   removing the support structure from the intermediate consolidated article to yield a consolidated part.

2. The method of claim 1, wherein the support structure comprises a first powder material and the part comprises a second powder material, wherein a sintering temperature of the first powder material is greater than a sintering temperature of the second powder material, and wherein the part detaches from the support structure during sintering.

3. The method of claim 1, wherein removing the support structure comprises breaking an interface between the part and the plurality of pins of the support structure to release the part from the support structure.

4. The method of claim 1, wherein printing the green body article comprises depositing a spacer between the support structure and the part in the green body article such that the support structure indirectly contacts the part only via the spacer, and wherein the spacer is a polymeric material.

5. The method of claim 1, comprising printing an additional support structure within an airfoil of the part, wherein a core of the additional support structure has a plurality of core protrusions extending away from the core and toward an inner surface of the airfoil, wherein the core is configured to support and block deformation of the airfoil during the post-printing thermal processing.

6. The method of claim 5, comprising removing the core of the additional support structure from the airfoil after performing the post-printing thermal processing.

7. The method of claim 1, wherein printing the green body article comprises:
   forming a skid of the support structure, wherein the skid is disposed below a bottom portion of the part; and
   forming a first set of pillars of the support structure on the skid, wherein the first set of pillars extends perpendicularly away from the skid and to a lower surface of the bottom portion of the part.

8. The method of claim 7, wherein printing the green body article comprises forming a second set of pillars of the support structure on the skid, wherein the second set of pillars extends perpendicularly away from the skid and to the top portion of the part, wherein a length of the first set of pillars is less than a length of the second set of pillars.

9. The method of claim 8, wherein forming the first set of pillars and forming the second set of pillars comprises forming the first set of pillars and forming the second set of pillars about a perimeter of the part.

10. The method of claim 5, wherein the core comprises a first powder material and the part comprises a second powder material, wherein a sintering temperature of the first powder material is greater than a sintering temperature of the second powder material, and wherein the airfoil is configured to shrink during sintering to compress the core within an interior of the airfoil to fracture the core.

* * * * *